United States Patent
Menezo et al.

(10) Patent No.: US 9,366,888 B2
(45) Date of Patent: Jun. 14, 2016

(54) DEVICE FOR GENERATING A MODULATION OF AN OPTICAL SIGNAL

(71) Applicant: Commissariat a l'energie atomique et aux energies alternatives, Paris (FR)

(72) Inventors: Sylvie Menezo, Voiron (FR); Giovanni Beninca De Farias, Grenoble (FR); Olivier Dubray, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 3 days.

(21) Appl. No.: 14/474,812

(22) Filed: Sep. 2, 2014

(65) Prior Publication Data

US 2015/0063741 A1 Mar. 5, 2015

(30) Foreign Application Priority Data

Sep. 2, 2013 (FR) ...................................... 13 58376

(51) Int. Cl.
G06F 1/035 (2006.01)
G02F 1/025 (2006.01)
G02F 1/225 (2006.01)
H01S 3/00 (2006.01)
G02F 1/015 (2006.01)

(52) U.S. Cl.
CPC ............... *G02F 1/025* (2013.01); *G02F 1/225* (2013.01); *H01S 3/0085* (2013.01); *G02F 2001/0151* (2013.01); *G02F 2201/16* (2013.01)

(58) Field of Classification Search
None
See application file for complete search history.

(56) References Cited

U.S. PATENT DOCUMENTS

| | | | | |
|---|---|---|---|---|
| 6,289,151 B1* | 9/2001 | Kazarinov | ............. | B82Y 20/00 385/24 |
| 6,766,083 B2* | 7/2004 | Bona | .................. | G02B 6/12007 385/32 |
| 2003/0235367 A1* | 12/2003 | Yamazaki | .......... | G02B 6/29343 385/39 |
| 2013/0044973 A1 | 2/2013 | Akiyama | | |
| 2014/0110572 A1* | 4/2014 | Li | ......................... | G01J 1/0209 250/227.23 |

OTHER PUBLICATIONS

Partial European Search Report dated Oct. 16, 2014, which issued during prosecution of European Application No. 13183103.2, which corresponds to the present application.
Lin Zhang, et al. "Silicon-Based Microring Resonator Modulators for Intensity Modulation" IEEE Journal of Selected Topics in Quantum Electronics, vol. 16, No. 1, Jan./Feb. 2010.
Sasikanth Manipatruni, et al. "Ultra-low voltage, ultra-small mode volume silicon microring modulator" Optics Express, Aug. 16, 2010, vol. 18, No. 17.

(Continued)

*Primary Examiner* — Sung Pak
(74) *Attorney, Agent, or Firm* — Troutman Sanders LLP

(57) ABSTRACT

The invention relates to a device generating a modulation of an optical signal characterized in that the device comprises a first ring resonator modulator including a first waveguide, a first ring waveguide being optically coupled to the first waveguide, and a first control device, and a second ring resonator modulator including a second waveguide, a second ring waveguide being optically coupled to the second waveguide and being independent of the first ring, and a second control device, the device having at least one characteristic that influences the chirp introduced by the device, the characteristics of the device being selected in a manner so as to minimize the absolute value of the chirp introduced by the device.

14 Claims, 11 Drawing Sheets

(56) References Cited

OTHER PUBLICATIONS

Matthias Seimetz, "High-Order Modulation for Optical Fiber Transmission" Springer Series in Optical Sciences 143, DOI 10.1007/978-3-540-93771-5-1, 2009.

F. Devaux, et al. "Simple Measurement of Fiber Dispersion and of Chirp Parameter of Intensity Modulated Light Emitter" Journal of Lightwave Technology, vol. 11, No. 12, Dec. 1993.

F. Devaux, et al. "Simple Measurement of Fiber Dispersion and of Chirp Parameter of Intensity Modulated Light Emitter" Journal of Lightwave Technology, 11(12):1937-1940, Dec. 1993.

Sasikanth Manipatruni, et al. "Ultra-low voltage, ultra-small mode volume silicon microring modulator", Optics Express, 18(17):18235-18242, Aug. 2010.

Matthias Seimetz, "High-Order Modulation for Optical Fiber Transmission" Springer Series in Optical Sciences, 2009.

Lin Zhang, et al. "Silicon-Based Microring Resonator Modulators for Intensity Modulation", IEEE Journal of Selected Topics in Quantum Electronics, 16(1):149-158, Jan./Feb. 2010.

French Search Report dated Apr. 3, 2014, which issued during prosecution of French Application No. 1358376, which corresponds to the present application.

French Written Opinion dated Sep. 2, 2013, which issued during prosecution of French Application No. 1358376, which corresponds to the present application.

Yunchu Li, et al. "Enhanced Performance and Flexibility in Silicon Modulators based on a Coupled-Ring-Resonator Structure" Optical Fiber Communication/National Fiber Optic Engineers Conference 2008, pp. 1-3.

Lili Sun, et al. "Chirp-free optical return-to-zero modulation based on a single microring resonator" Optics Express 2012, 20(7):7663-7671.

Tong Ye, et al. "Chirp-free optical modulation using a silicon push-pull coupling microring" Optics Letters 2009, 34(6):785-787.

Lin Zhang, et al. "Creating RZ data modulation formats using parallel silicon microring modulators for pulse carving in DPSK" Lasers and Electro-Optics 2008, pp. 1-2.

Lin Zhang, et al. "Monolithic modulator and demodulator of differential quadrature phase-shift keying signals based on silicon microrings" Optics Letters 2008, 33(13):1428-1430.

\* cited by examiner

DEVICE FOR GENERATING A MODULATION OF AN OPTICAL SIGNAL

CROSS REFERENCE TO RELATED APPLICATIONS

This application claims priority to French Patent Application No. 13 58376 filed Sep. 2, 2013. This application is herein incorporated by reference.

FIELD OF THE INVENTION

The present invention relates to a device for generating a modulation of an optical signal. The present invention also relates to a method for cancelling the chirp introduced by a device for generating a modulation of an optical signal for an incident optical signal. The present invention also relates to a method for calibrating such a device for generating a modulation and a method for locking the emission wavelength of a laser source on such a device for generating a modulation.

BACKGROUND

In the field of optical transmission, devices for generating a modulation of an optical signal are used. Throughout the remainder of the description, a device for generating a modulation of an optical signal will simply be referred to as a modulation device.

When a modulation device is used to perform an intensity modulation of an input optical signal, the output optical signal obtained is generally also phase modulated, which is not desired. By definition, the chirp parameter denoted as α is reflective of the existence of this undesirable phase modulation over the output signal. A possible mathematical definition of the chirp parameter α is as follows:

$$\alpha = 2I(t) \cdot \frac{\frac{d\phi(t)}{dt}}{\frac{dI(t)}{dt}}$$

where:
- I(t) is the instantaneous intensity of the optical field measured at an output of the modulation device considered, and
- Φ(t) is the instantaneous phase of the optical field measured at an output of the modulation device considered.

In the monograph by Mr. Seimetz which is entitled "High-Order Modulation for Optical Fiber Transmission" that was published by Springer in 2009, it is shown how to generate optical signals following a complex modulation. Such a complex modulation is referred to as "I-Q modulation" (I is the "in-phase" component, and Q the quadrature component). The generation of optical signals following a complex modulation involves the use of several modulation devices having a zero chirp parameter α.

SUMMARY

There is therefore a need for a device for generating an intensity modulation of an optical signal that provides the ability to obtain an output modulated optical signal wherein the phase is not modulated.

To that end, the object of the invention relates to a device for generating a modulation of an optical signal having a first ring resonator modulator having a first waveguide having an input and an output, a first ring waveguide, referred to as first ring, the first ring being optically coupled to the first waveguide and having a first effective index, and a first control device capable of modulating the first effective index of the first ring in accordance with a first control law. The device also includes a second ring resonator modulator having a second waveguide having an input and an output, the input of the second waveguide being connected to the output of the first waveguide, a second ring waveguide, referred to as second ring, the second ring being optically coupled to the second waveguide, having a second effective index, and being independent from the first ring, and a second control device capable of modulating the second effective index of the second ring in accordance with a second control law. The device has at least one characteristic that influences the chirp introduced by the device, the characteristics of the device being chosen so as to minimise the absolute value of the chirp introduced by the device.

According to some particular examples, the device includes one or more of the following features, taken into consideration individually or in accordance with any technically possible combination:

- the first ring resonator modulator has a first transfer function defined as the ratio between the optical field at the output of the first modulator and the incident optical field and presents first parameters influencing the first transfer function, the second ring resonator modulator has a second transfer function defined as the ratio between the optical field at the output of the second modulator and the incident optical field and presents second parameters influencing the second transfer function, the characteristics influencing the chirp introduced by the device being the first parameters and the second parameters.
- the two ring resonator modulators are identical.
- the first control law and the second control law are such that when the first effective index varies by a first quantity, the second effective index varies by a second quantity of equivalent magnitude but with the opposite sign relative to the first quantity.
- the first and second control laws respectively control the first and second ring modulators by injection of carriers, the first control law being a varying between $V_{BIAS}$ and $V_{BIAS}-A$, with A being a positive value and $V_{BIAS}$ being a value strictly greater than A and the second control law being a voltage varying between $V_{BIAS}$ and $V_{BIAS}+\beta*A$, with β being a strictly positive value.
- the first and second control laws respectively control the first and second ring modulators by depletion of carriers, the first control law being a voltage varying between $-V_{BIAS}$ and $-V_{BIAS}+A$, with A being a positive value and $V_{BIAS}$ being a value strictly greater than A and the second control law being a voltage varying between $-V_{BIAS}$ and $-V_{BIAS}-\beta*A$, with β being a strictly positive value.
- the device includes an input, an output and an intermediate waveguide, with the intermediate waveguide connecting the input of the second waveguide to the output of the first waveguide.
- the device has an input, an output, with the first ring resonator modulator having a third waveguide having an input and an output, and the third waveguide being optically coupled to the first ring, the input of the device being the input of the third waveguide.
- the first waveguide and the second waveguide are combined.

The invention also relates to a method for cancelling the chirp introduced by a device for generating a modulation of an optical signal for an incident optical signal including a first ring resonator modulator including a first waveguide having an input and an output, a first ring waveguide, referred to as first ring, the first ring being optically coupled to the first waveguide and having a first effective index, and a first control device capable of modulating the first effective index of the first ring in accordance with a first control law. The device also has a second ring resonator modulator including a second waveguide having an input and an output, the input of the second waveguide being connected to the output of the first waveguide, a second ring waveguide, referred to as second ring, the second ring being optically coupled to the second waveguide, having a second effective index, and being independent from the first ring, and a second control device capable of modulating the second effective index of the second ring in accordance with a second control law. The method includes the steps of choice of initial characteristics for the device, and modification of at least one of the initial characteristics of the device in a manner so as to minimise the absolute value of the chirp introduced by the device.

According to some particular examples, the method has one or more of the following features, taken into consideration individually or in accordance with any technically possible combination:

the first ring resonator modulator has a first transfer function defined as the ratio between the optical power at the output of the first modulator and the incident optical power and presents first parameters influencing the first transfer function and the second ring resonator modulator has a second transfer function defined as the ratio between the optical power at the output of the second modulator and the incident optical power and presents second parameters influencing the second transfer function, the characteristics modified during the step of modification being selected from among the first parameters and the second parameters.

during the choice step, the initial characteristics for the device for generating a modulation are such that the two ring resonator modulators are identical.

during the step of modification, only the characteristics relating to the first control law and the characteristics relating to the second control law are modified.

during the step of modification, the first control law and the second control law are modified such that when the first effective index varies by a first quantity, the second effective index varies by a second quantity of equivalent magnitude but with the opposite sign relative to the first quantity.

The invention also provides a method for calibrating a device for generating a modulation of an optical signal as previously described above, having the successive steps of: injection of a wave at a reference wavelength into the device for generating a modulation of an optical signal, adjusting of the resonance length of the first modulator on the reference wavelength by using the output signal from the first waveguide when the wave at a reference wavelength is injected into the device for generating a modulation of an optical signal, and adjusting of the resonance length of the second modulator on the reference wavelength by using the output signal from the second waveguide when the wave at a reference wavelength is injected into the device for generating a modulation of an optical signal.

The invention also provides a method for locking the emission wavelength of a laser source on a device for generating a modulation of an optical signal as previously described above, comprising the use of the output signal of the second waveguide when the device for generating a modulation of an optical signal is fed by the laser source.

BRIEF DESCRIPTION OF THE DRAWINGS

Other features and advantages of the invention will become apparent upon reviewing the description that follows detailing the examples of the invention, provided purely by way of example and with reference made to the drawings which are as follows.

DETAILED DESCRIPTION

Figure 1:
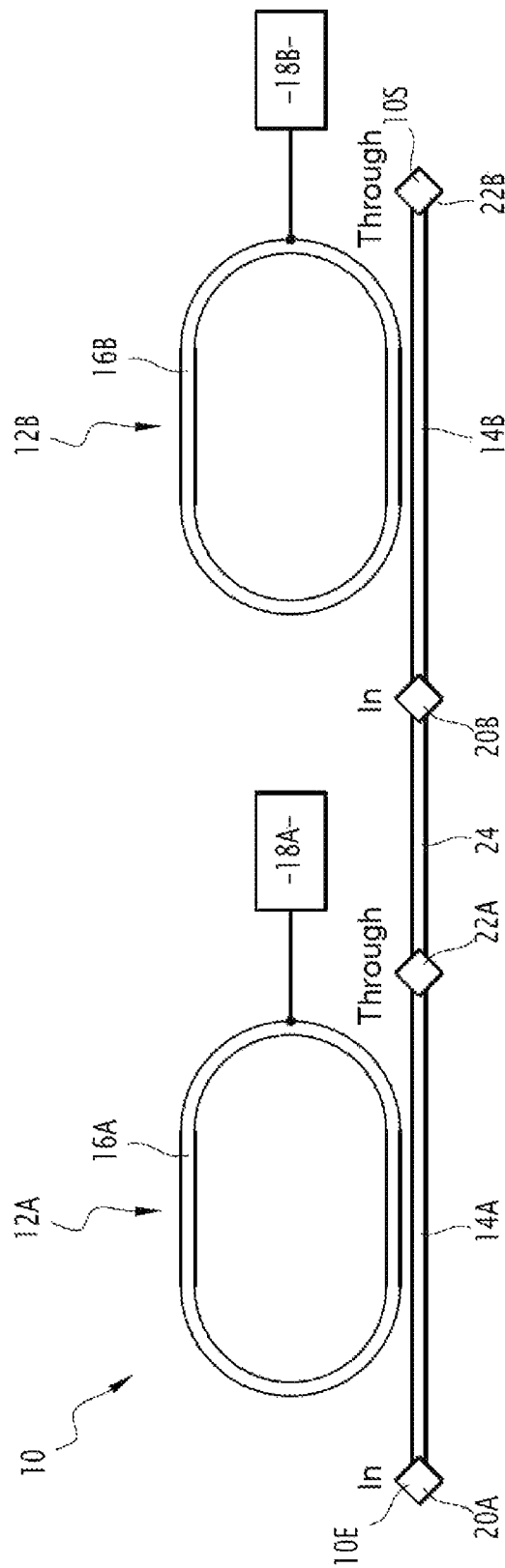
FIG. 1, is a schematic view of a device for generating a modulation according to an example of the invention.

A device for generating a modulation of an optical signal 10 is presented in FIG. 1 In the following sections, the device for generating a modulation 10 shall simply be referred to as modulation device 10.

The modulation device 10 includes an input 10S and an output 10E. It is desirable for the modulation device 10 to present an absolute value of the chirp introduced by the modulation device 10 for an incident optical signal that is minimal.

In a general sense, the term "input" shall be understood in the description to refer to a port through which a luminous flux enters into the element considered. In a corresponding manner, the term "output", shall be understood in the description to refer to a port through which a luminous flux exits out of the element considered.

Applied to the case of the input 10E and the output 10S of the modulation device 10 this signifies that the input 10E of the modulation device 10 is a port through which a luminous flux enters into the modulation device 10 and that the output 10S of the modulation device 10 is a port through which the luminous flux modulated by the modulation device 10 exits the device. In effect the modulation device 10 is capable of generating a modulation of an optical signal introduced at the input 10E.

Expressed in other words, the modulation device 10 is thus part of a modulation system. The modulation system has a light source and the modulation device 10, with the light source being connected to the input 10E of the modulation device 10 in a manner so as to inject during operation a luminous flux into the modulation device 10.

By way of an example, the light source is a laser source and a waveguide connects the output of the light source to the input 10E of the modulation device 10.

This chirp is quantified by a chirp parameter denoted as α. As explained previously, a possible mathematical definition of the chirp parameter α is as follows:

$$\alpha = 2I(t) \cdot \frac{\frac{d\phi(t)}{dt}}{\frac{dI(t)}{dt}}$$

where:
I(t) is the instantaneous intensity of the optical field measured at the output 10S of the modulation device 10, and
Φ(t) is the instantaneous phase of the optical field measured at the output 10S of the modulation device 10.

The measurement of the chirp parameter α is, for example, carried out according to the protocol detailed in the article by F Devaux, entitled "*Simple Measurement of Fiber Dispersion and of Chirp Parameter of Intensity Modulated Light Emitter*" and which was published in publication JOURNAL OF LIGHTWAVE TECHNOLOGY in Volume 11, No. 12, dated December 1993.

In order to obtain this result, an arrangement is proposed having of two rings in a push-pull configuration so as to eliminate the chirp. The chirp is eliminated since the electrical signal is complementary between the two rings, thus the chirp that is introduced to the first ring is offset at the second ring. This principle is described in more precise detail in the description that follows.

The modulation device 10 includes a first ring resonator modulator 12A and a second ring resonator modulator 12B.

The elements of a ring resonator modulator are described in detail in the annex that describes the FIGS. 9 to 13. Only a portion of these elements are comprised here, it being assumed that the definitions of these elements are known thanks to the aforementioned annex.

The first modulator 12A has a first waveguide 14A, a first ring waveguide 16A, referred to as the first ring 16A and a first control device 18A.

The first waveguide 14A has an input 20A and an output 22A.

The first waveguide 14A may be of any shape.

In the case of FIG. 1, by way of an example, the input 20A is the In port and the output 22A is the Through port.

The first ring 16A is optically coupled to the first waveguide 14A.

The first ring 16A has a first effective index Neff1.

The first control device 18A is capable of modulating the first effective index Neff1 of the first ring 16A in accordance with a first control law L1.

In a similar manner, the second modulator 12B has a second waveguide 14B, a second ring waveguide 16B, referred to as the second ring 16B and a second control device 18B.

The second waveguide 14B has properties that are similar to the properties described for the first waveguide 14A. In particular, the second waveguide 14B has an input 20B and an output 22B.

The input 20B of the second waveguide 14B is connected to the output 22A of the first waveguide 14A. Such a property allows for the signal at the output of the optical modulation device 10 to be influenced by both the first ring 16A and the second ring 16B.

Several configurations are possible for connecting the input 20B of the second waveguide 14B to the output 22A of the first waveguide 14A.

In the case of FIG. 1, by way of example, the input 20B of the second waveguide 14B is the In port of the second modulator 12B and the output 22B of the second waveguide 14B is the Through port of the second modulator 12B. The modulation device 10 includes an intermediate waveguide 24. The intermediate waveguide 24 connects the In port 20B of the second waveguide 14B to the Through the port 22A of the first waveguide 14A. In this configuration, the input 10E of the modulation device 10 is the In port 20A of the first modulator 12A and the output 10S of the modulation device 10 is the Through port 22B of the second modulator 12B.

Figure 6:
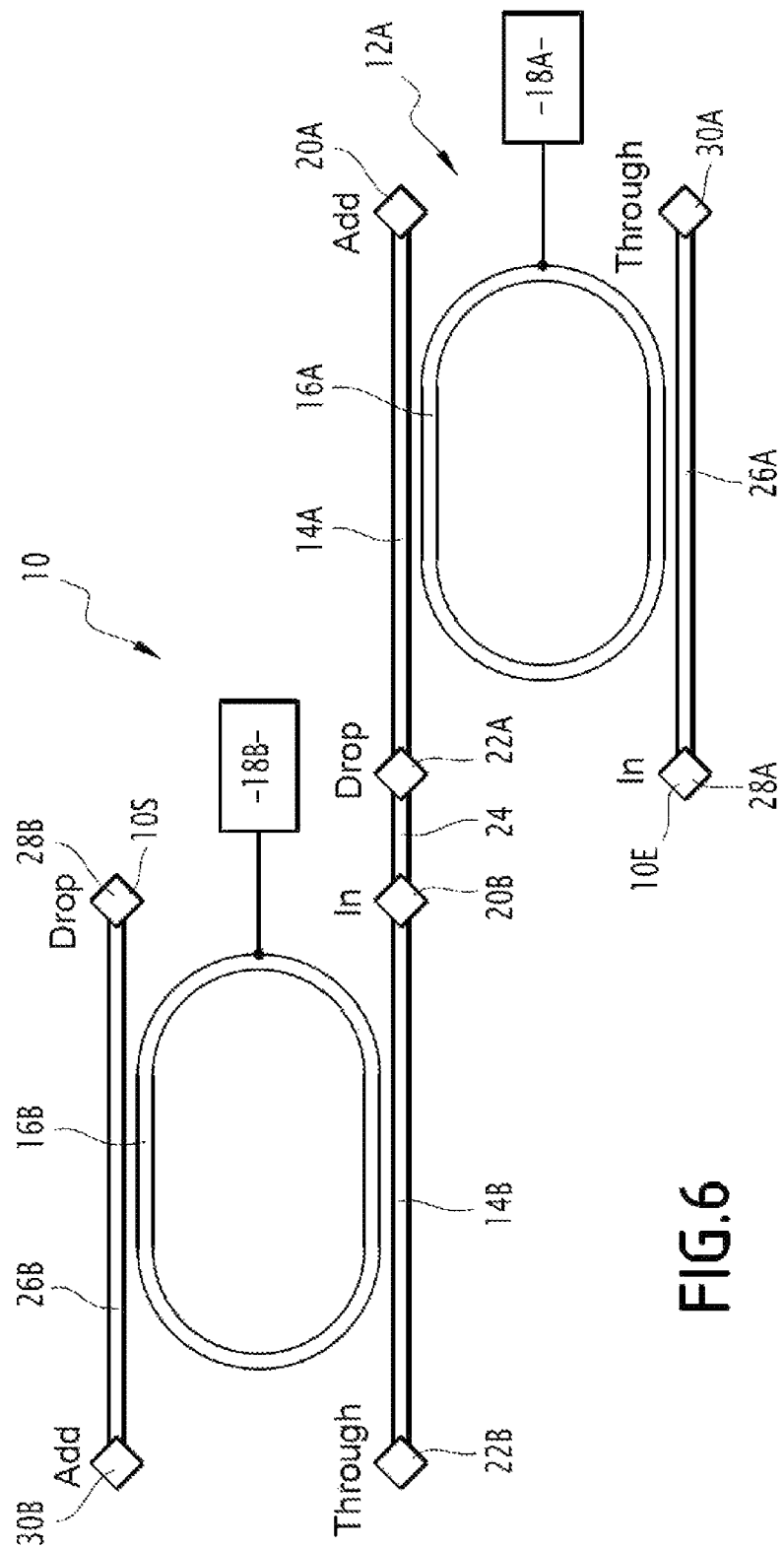
FIG. 6, is a schematic view of a device for generating a modulation according to another example of the invention.

According to a second configuration illustrated by the FIG. 6, each modulator 12A, 12B has two waveguides each one optically coupled to their ring 16A, 16B respectively. Thus, the first ring resonator modulator 12A has the first waveguide 14A which extends between the Add port 20A and the Drop port 22A and the third waveguide 26A which extends between the In port 28A and the Through port 30A. Similarly, the second ring resonator modulator 12B has the second waveguide 14B which extends between the In port 20B and the Through port 22B and the fourth waveguide 26B which extends between the Drop port 28B and the Add port 30B. The modulation device 10 also includes an intermediate waveguide 24 connecting the Drop port 22A of the first modulator 12A to the In port 20B of the second modulator 14B. In this second configuration, the input 10E of the modulation device 10 is In port 28A of the first modulator 12A and the output 10S of the modulation device 10 is the Drop port 28B of the second modulator 12B.

According to a third configuration not shown, the first waveguide 14A and the second waveguide 14B are combined. In this third configuration, the input 10E of the modulation device 10 is both the In port of the first modulator 12A as well as the In port of the second modulator 12B while the output 10S of the modulation device 10 is both the Through port of the first modulator 12A as well as the Through port of the second modulator 12B. In all the three configurations, each time, the input 20B of the second waveguide 14B is connected to the output 22A of the first waveguide 14A.

In addition, the input 10E of the modulation device 10 is the input of the first waveguide 14. This signifies that the light source of the modulation system previously mentioned above is connected to the input of the first waveguide 14.

The second ring 16B has properties that are similar to the properties described for the first ring 16A. Notably, the second ring 16B has a second effective index Neff2.

The second ring 16B is independent from the first ring 16A.

By definition, two rings are independent if the effective index of one of the two rings may be varied independently of the effective index of the other ring.

For example, the two outer zones of the rings are in electrical contact, this contact corresponding to the electrical ground while the two inner zones of the rings are not in electrical contact. The voltage applied to the inner zone of the first ring is independent of the voltage applied to the inner zone of the second ring.

The second control device 18B has properties that are similar to the properties described for the first control device 18A. In particular, the second control device 18B is capable of modulating the second effective index Neff2 of the second ring 16B in accordance with a second control law L2.

The modulation device 10 has at least one characteristic influencing the chirp introduced by the modulation device 10 for an incident optical signal. The characteristic or the characteristics features of the modulation device 10 are then chosen so as to minimise the absolute value of the chirp introduced by the modulation device 10 for an incident optical signal.

By way of an example, with reference to the annex, the characteristic or characteristics are selected from among the following characteristics:

The distance between the first ring 16A and the first waveguide 14A of the first modulator 12A,
the distance between the second ring 16B and the second waveguide 14B of the second modulator 12B,
the radius of curvature of the first ring 16A of the first modulator 12A,
the radius of curvature of the second ring 16B of the second modulator 12B,
the length of interaction between the first ring 16A and the first waveguide 14A of the first modulator 12A,
the length of interaction between the second ring 16B and the second waveguide 14B of the second modulator 12B,
the first control law L1,
the second control law L2,
the parameter of coupling between the first ring 16A and the first waveguide 14A of the first modulator 12A, and
the parameter of coupling between the second ring 16B and the second waveguide 14B of the second modulator 12B.

According to a variant example, the first ring resonator modulator 12A has a first transfer function T1 defined as the ratio between the optical field (that is to say, the electrical field associated with a light wave) at the output of the first modulator 12A and the incident optical field and presents the first parameters influencing the first transfer function T1. As explained in reference to the annex, the first parameters are, for example, the distance between the first ring 16A and the first waveguide 14A of the first modulator 12A, the radius of curvature of the first ring 16A of the first modulator 12A, the length of interaction between the first ring 16A and the first waveguide 14A of the first modulator 12A, and the first control law L1. In an alternative manner, the first parameters are, for example, the parameter of coupling between the first ring 16A and the first waveguide 14A of the first modulator 12A, and the first control law L1. In this variant example, the characteristic or characteristics influencing the chirp introduced by the modulation device 10 are the first parameters.

According to another variant example, the second ring resonator modulator 12B has a second transfer function T2 defined as the ratio between the optical field at the output of the second modulator 12B and the incident optical field and presents the second parameters influencing the second transfer function T2. As explained with reference to the annex, the second parameters are, for example, the distance between the second ring 16B and the second waveguide 14B of the second modulator 12B, the radius of curvature of the second ring 16B of the second modulator 12B, the radius of curvature of the second ring 16B of the second modulator 12B, the length of interaction between the second ring 16B and the second waveguide 14B of the second modulator 12B, and the second control law L2. In an alternative manner, the first parameters are, for example, the parameter of coupling between the second ring 16B and the second waveguide 14B of the second modulator 12B, and the second control law L2. In this variant example, the characteristic or characteristics influencing the chirp introduced by the modulation device 10 are the second parameters.

According to yet another variant example, the characteristic or characteristics influencing the chirp introduced by the modulation device 10 are the first parameters and the second parameters or are selected from amongst the first parameters and the second parameters.

Preferably, according to a variant example, the two modulators 12A, 12B are identical. The term "identical" modulator in the context of this invention is understood to refer to the modulators 12A and 12B having coupling parameters that are identical.

Such modulators 12A, 12B are generally modulators whose geometrical parameters are identical. This makes the manufacture of these modulators easier since it is easier to produce two modulators with the same dimensions than to produce two different rings wherein it is desired to space the resonant length by a desired fixed value.

In this variant example, the characteristic or characteristics are the parameter or parameters characterising the first control law L1 and the second control law L2.

The first control law L1 and the second control law L2 are such that when the first effective index Neff1 varies by a first quantity $\Delta$Neff1, the second effective index Neff2 varies by a second quantity $\Delta$Neff2 of equivalent magnitude but with the opposite sign relative to the first quantity $-\Delta$Neff1.

Mathematically, this translates into the equivalence equation $\Delta$Neff2$=-\Delta$Neff1.

As a result thereof, the first control law L1 and the second control law L2 are such that the sum of the first effective index Neff1 and the second effective index Neff2 is constant over time.

By way of example, the control laws L1 and L2 are two modulation voltages that reproduce the sequence of bits to be transmitted in phase opposition. For this reason, the two modulators 12A and 12B are said to be modulated in push-pull, which means modulated by voltages in phase opposition. Thus, the first control law L1 is written as $V_{BIAS}+V(t)$ whereas the second control law L2 is written as $V_{DC}-V(t)$ where:

V(t) is the modulation voltage, and
$V_{BIAS}$ is a static tension (positive or negative depending on the nature of the electro-optical phenomenon that enables the changing of the effective index of the ring 16A or 16B considered) that enables the possibility of continuously biasing the modulator 12A or 12B considered.

In the carrier injection mode, the first control law L1 is a voltage varying between $V_{BIAS}$ and $V_{BIAS}-A$, where A is a positive value and $V_{BIAS}$ is a value strictly greater than A. The second control law L2 is a voltage varying between $V_{BIAS}$ and $V_{BIAS}+\beta*A$, where $\beta$ is a positive value. In this case, the two modulators 12A and 12B are continuously biased to the voltage $V_{BIAS}$.

More specifically, when the voltage applied by the first control law L1 varies from $V_{BIAS}$ to $V_{BIAS}-A$ to give rise to the variation in index of $\Delta$Neff1, the voltage applied by the second control law L2 varies from $V_{BIAS}+V_{BIAS}+\beta*A$ to give rise to the variation in index $\Delta$Neff2$=-\Delta$Neff1. Conversely, when the voltage applied by the first control law L1 varies from $V_{BIAS}-A$ to $V_{BIAS}$ to give rise to the variation in index of $-\Delta \text{Neff1}$, the voltage applied by the second control law L2 varies from $V_{BIAS}+\beta*A$ to $V_{BIAS}$ to give rise to the variation in index $-\Delta \text{Neff2}$.

The table here below lays out the correspondence between the voltages applied by the control laws L1 and L2 of the modulators 12A and 12B according to the bit to be transmitted 0 or 1, in order to ensure the generation of a modulation free of chirp in the carrier injection mode.

| Bit | 1 | 0 |
|---|---|---|
| Voltage applied to the first modulator 12A | $V_{BIAS} - A$ | $V_{BIAS}$ |
| Voltage applied to the second modulator 12B | $V_{BIAS} + \beta*A$ | $V_{BIAS}$ |

In the carrier depletion mode, the first control law L1 is a voltage that varies between $-V_{BIAS}$ and $-V_{BIAS}+A$, where A is a positive value and $V_{BIAS}$ is a value strictly greater than A. The second control law L2 is a voltage that varies between $-V_{BIAS}$ and $-V_{BIAS}-\beta*A$, where $\beta$ is a positive value. In this case, the two modulators 12A and 12B are continuously biased to the voltage $-V_{BIAS}$.

More precisely, when the voltage applied by the first control law L1 varies from $-V_{BIAS}$ to $-V_{BIAS}+A$ to give rise to the variation in index of $\Delta \text{Neff1}$, the voltage applied by the second control law L2 varies from $V_{BIAS}$ to $-V_{BIAS}-\beta*A$ to give rise to the variation in index $\Delta \text{Neff2}=-\Delta \text{Neff1}$. When the voltage applied by the first control law L1 varies from $-V_{BIAS}+A$ to $-V_{BIAS}$ to give rise to the variation in index $-\Delta \text{Neff1}$, the voltage applied by the second control law L2 varies from $-V_{BIAS}-\beta*A$ to $-V_{BIAS}$ to give rise to the index variation $-\Delta \text{Neff2}$.

The table here below lays out the correspondence between the voltages applied by the control laws L1 and L2 of the modulators 12A and 12B according to the bit to be transmitted 0 or 1, in order to ensure the generation of a modulation free of chirp in the carrier depletion mode.

| Bit | 1 | 0 |
|---|---|---|
| Voltage applied to the first modulator 12A | $-V_{BIAS} + A$ | $-V_{BIAS}$ |
| Voltage applied to the second modulator 12B | $-V_{BIAS} - \beta*A$ | $-V_{BIAS}$ |

Figure 3:
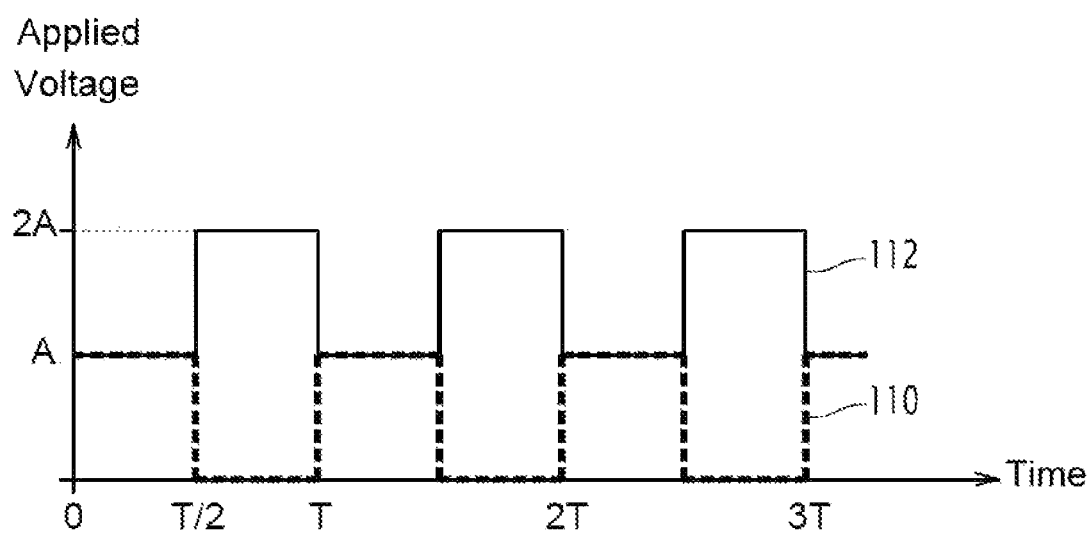
FIG. 3, is a graph presenting the temporal evolution in an example of voltage control laws applied to the device shown in FIG. 1.

According to the particular case illustrated in FIG. 3, in the carrier injection mode, the static voltage $V_{BIAS}$ is A, with A being a positive value. The first control law L1 is then a binary voltage varying between 0 and A, where A is a strictly positive value and the second control law L2 is a binary voltage varying between A and 2A.

More precisely, over a bit 0 to be transmitted, a modulation voltage of amplitude $V(t)=-A$ is applied to the two rings 16A, 16B, while over a bit 1, a voltage of amplitude $V(t)=A$ is applied to the two rings 16A, 16B.

Expressed in alternative terms, the first control law L1 and the second control law L2 are such that when the voltage applied by the first control law L1 is zero, the voltage applied by the second control law L2 is equal to 2A and when the voltage applied by the first control law L1 is a voltage that amounts to A, the voltage applied by the second control law L2 is equal to A.

In the case of a carrier depletion mode, the static voltage $V_{BIAS}$ then amounts to $-A$, where A is a positive value. The first control law L1 is then a binary voltage varying between 0 and $-A$, where A is a strictly positive value and the second control law L2 command is a binary voltage varying between $-A$ and $-2A$.

More precisely, over a bit 0 to be transmitted, a modulation voltage of amplitude $V(t)=-A$ is applied to the two rings 16A, 16B, while over a bit 1, a voltage of amplitude $V(t)=A$ is applied to the two rings 16A, 16B.

Expressed in alternative terms, the first control law L1 and the second control law L2 are such that when the voltage applied by the first control law L1 is zero, the voltage applied by the second control law L2 is equal to $-A$ and when the voltage applied by the first control law L1 is a voltage that amounts to $-A$, the voltage applied by the second control law L2 is equal to $-2A$.

For such control laws, in operation, the modulation device 10 is such that the chirp parameter $\alpha 1$ introduced by the first modulator 12A and the second chirp parameter $\alpha 2$ have opposite chirp rates.

Figure 4:
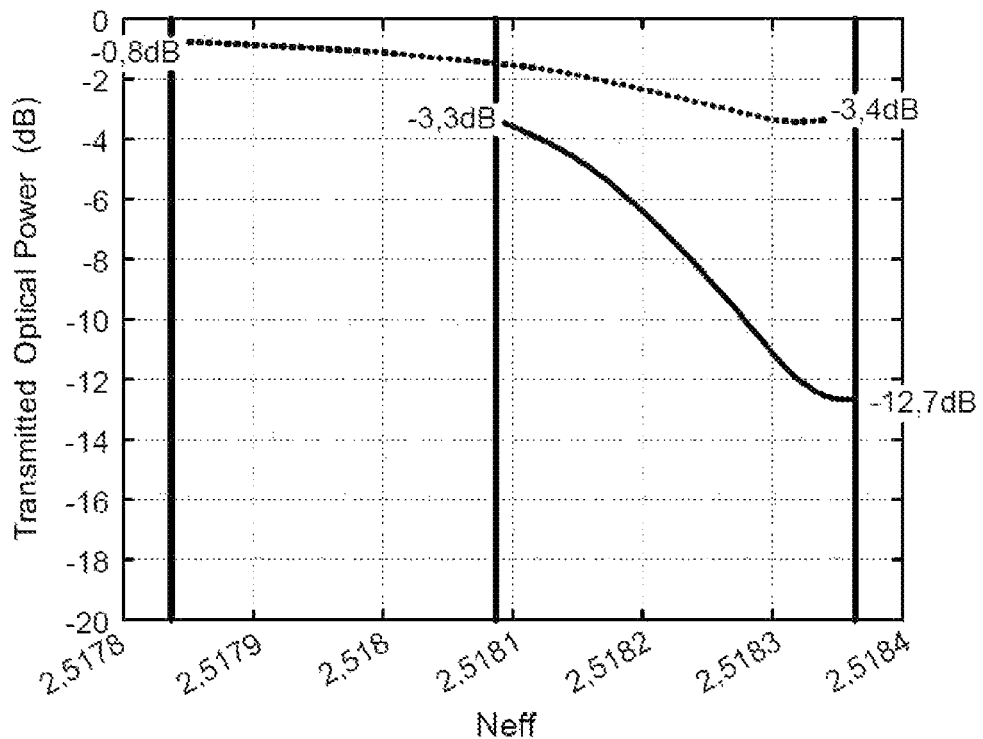
FIGS. 4 and 5, are graphs showing the simulated change in the intensity and in the phase, respectively, of the optical field as a function of the variation of the effective index at the output of the device shown in FIG. 1, and at the output of a device with one single ring resonator modulator.
Figure 5:
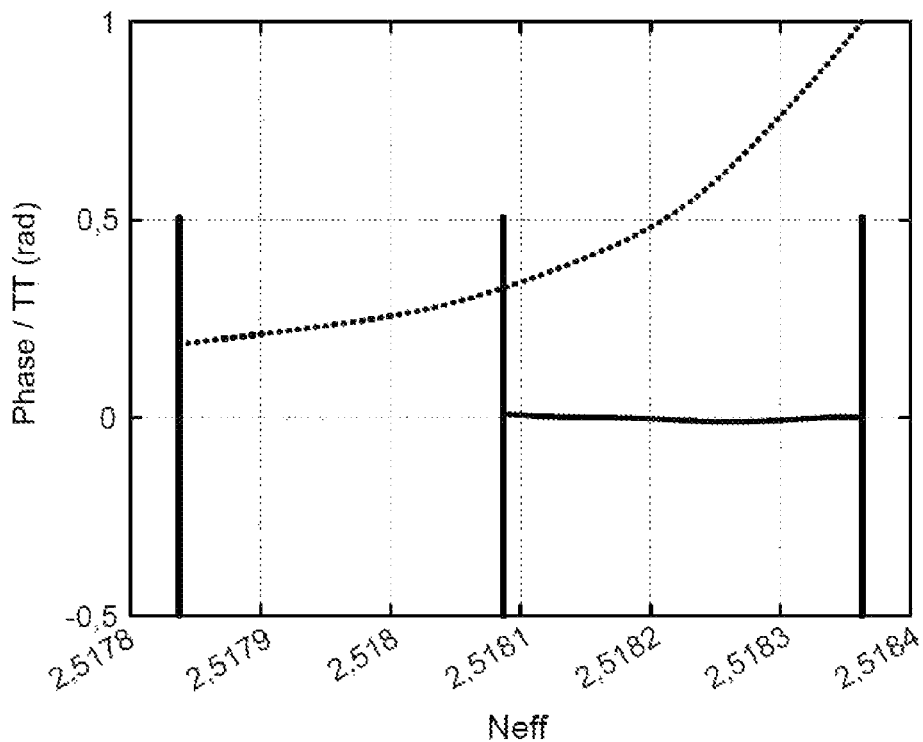

The associated performances are illustrated by the FIGS. 4 and 5. In the FIGS. 4 and 5, the curves represented in dotted lines are related to a device having a single ring while the curves represented in solid lines correspond to the modulation device 10 according to the first example shown in FIG. 1. The simulated performances are so for a parameter of radius of curvature of the rings R equal to 5 μm (microns), a length of interaction zero and coupling parameters equal to 0.0546.

For FIG. 4, the following table provides the ability to perform a comparison of the performance results obtained:

| | State of the Art (dB) | Invention (dB) |
|---|---|---|
| Transmission losses over the ON state | −0.8 | −3.3 |
| Transmission losses over the OFF state | −3.4 | −12.7 |
| Extinction Ratio | 2.6 | 9.4 |

It is in particular noted that the extinction ratio is higher with the modulation device 10 according to the invention, which is advantageous (obtaining a better modulation).

Furthermore, it is shown in FIG. 5 that the chirp parameter $\alpha$ is between $-0.3$ and 0 for a variation in effective index between $-3 \times 10^{-4}$ and 0. It follows therefrom that the chirp parameter $\alpha$ is close to zero over the range of optimal modulation for the modulation device 10 according to the above example.

Figure 7:
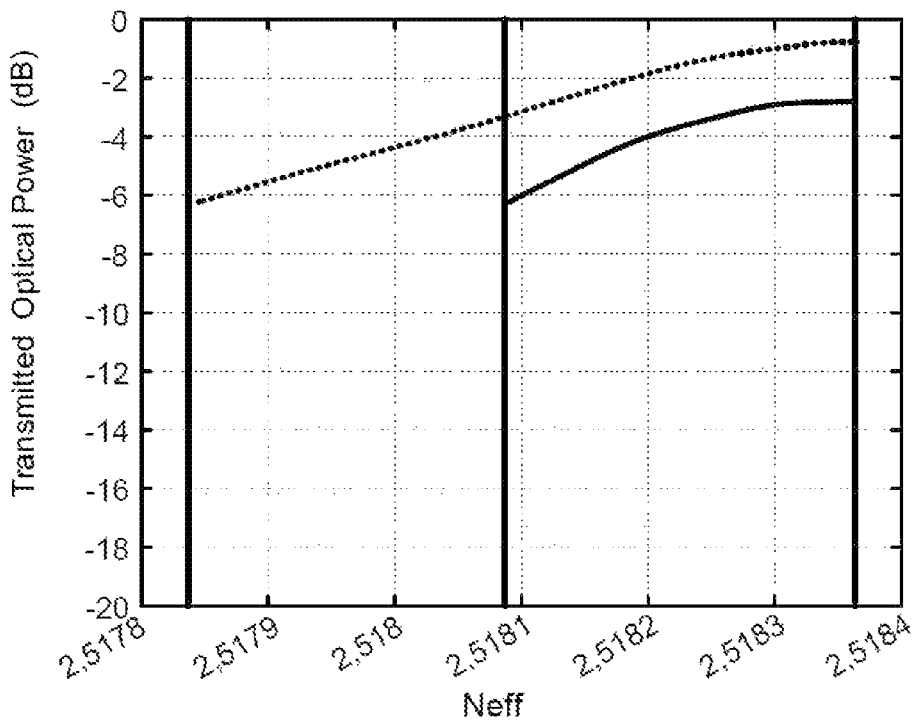
FIGS. 7 and 8, are respectively the same figures as FIGS. 4 and 5 for the A device according to the other example.
Figure 8:
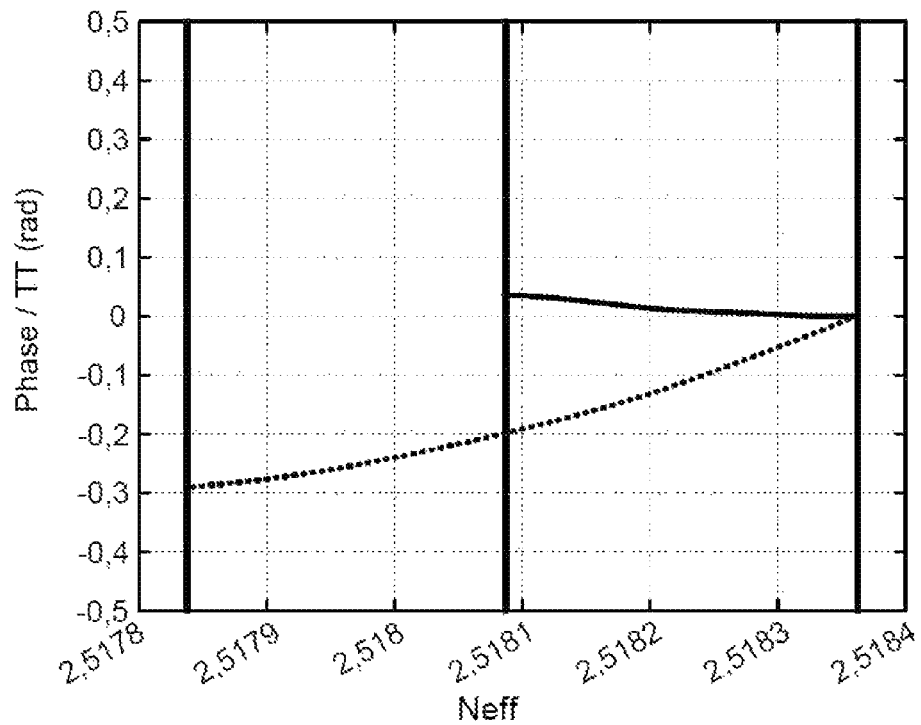

Similar observations may be noted in the FIGS. 7 and 8 for the modulation device 10 according to the another example wherein the coupling parameters are taken as equal to 0.02.

In the various different examples, the modulation device 10 according to the invention presents better performance than a device having only a single ring resonator modulator.

In order to control a ring resonator modulator, a voltage varying between 0 and V is applied. Upon denoting the capacitance of the ring as C, the consumption of the modulator is $C \cdot V^2$.

In the case of the modulation device 10, to each ring 16A, 16B, a voltage having an amplitude of V/2 is applied. More precisely, the voltage applied to the ring 16A of the first modulator 12A varies between 0 and V/2 and the voltage applied to the ring 16B of the second modulator 12B varies between V/2 and V. Upon denoting the capacitance of each of the rings 16A, 16B as C, the consumption of the modulation device 10 is given by $$2C \cdot (V/2)^2 = C \cdot V^2/2$$

Thus, the modulation device 10 of the invention consumes two times less electrical energy than a modulation device having only a single ring resonator modulator for generating an intensity modulation of an optical signal.

In addition, at the wavelength of operation of the modulation device 10, the extinction ratio is greater for the modulation device 10 according to the invention than for a modulation device having only a single ring resonator modulator.

The modulation of the optical signal is thus of better quality when the modulation device 10 according to the invention is used.

Furthermore, excursion of the phase of the optical field at the output of the modulation device 10 according to the invention is also reduced relative to the excursion at the output of a modulation device with a single ring resonator modulator. Upon observation of the FIGS. 5 and 8, it appears indeed that the phase presents a much lower excursion than the excursion of the phase observed for a device including one single ring modulator.

Figure 2:
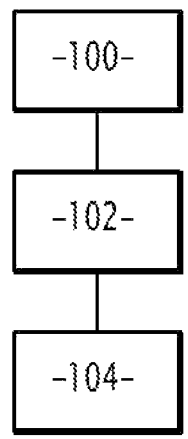
FIG. 2, is a flowchart of an example of the method for cancellation of the chirp from the device shown in FIG. 1.

The values of the characteristics that influence the chirp for the modulation device 10 are, for example, obtained by a cancellation method. This cancellation method is described with reference to the flowchart shown in FIG. 2.

The method includes the step 100 of choosing of the initial characteristics of the modulation device 10.

The method then includes the step 102 of modification of at least one of the initial characteristics of the modulation device 10 for generating a modulation such as to minimise the absolute value of the chirp introduced by the device 10 for generating a modulation for an incident optical signal.

By way of an illustration, this modification is performed by a series of iterations in an optimisation programme. The goal of this optimisation programme, starting from the initial characteristics, is to obtain the characteristics of the modulation device 10 that confer on the modulation device 10 a chirp parameter $\alpha$ that as much as possible approaches the value zero.

For this, a cost function C, representative of deviations for the chirp parameter $\alpha$ between the modulation device 10 controlled by the voltage control laws to be optimised and 0 is defined as follows. The cost function C written in the following form is considered:

$$C = \alpha_i^2$$

Where:

$\alpha_i$ is the value of the chirp parameter $\alpha$ introduced by the modulation device 10 to which are applied the voltage control laws to be optimised to the i-th iteration.

The value $\alpha_i$ is calculated by making use of a numerical simulation.

The cost function C thus defined is a positive function that should be minimised during the course of the step 102 of modification of the control laws.

In order to proceed with performing this minimisation, it is sufficient to start from the characteristics initially chosen in the step 100 of choosing the characteristics and to use a calculation method that provides the ability to reduce by iterations the value of the cost function C.

By way of an example, the calculation method used is a damped least squares method (often referred to by the English acronym DLS for "damped least-squares").

The characteristics to be applied to the modulation means 10 are thus obtained for the modulation device 10, after iterations of the optimisation programme.

The proposed method presents the advantage of being easy to put into practice.

In a preferred variant example, the cancellation of the chirp parameter $\alpha$ is obtained without iterations, with a calculation that enables obtaining the characteristic leading to such a cancellation.

According to preferred examples, during the step of selection, the initial characteristics for the device 10 for generating a modulation are such that the two ring resonator modulators 12A, 12B are identical. This makes it possible to further simplify the implementation of the cancellation process.

In order to further enhance this effect, during the modification step, only the characteristics relating to the first control law L1 and the characteristics relating to the second control law L2 are modified. In such a situation, the calculation can be performed without the use of iterations.

For example, in the step of modification, the first control law L1 and the second control law L2 are modified such that when the first effective index Neff1 varies by a first quantity, the second effective index Neff2 varies by a second quantity of equivalent magnitude but with the opposite sign relative to the first quantity. This makes it possible to obtain, by way of illustration, the control laws L1 and L2 obtained with reference to the FIG. 3.

In practice, the proper operation of the two ring resonator modulators 12A, 12B is in particular sensitive to the temperature of the ambient environment and to variations in the implementation of the process of manufacturing these modulators 12A, 12B. On account of this, there may be some misalignments occurring between the emission wavelength of the laser source powering the device 10 for generating a modulation and the resonance wavelength of the first ring 16A on the one hand, and on the other hand, the wavelength of the laser source and the resonance wavelength of the second ring 16B. To recap, the resonance wavelength of each of the rings 16A, 16B is controlled by a control device 18A, 18B respectively. The misalignments in wavelength result in the malfunctioning of the device 10 for generating a modulation.

In order to avoid such misalignments, a method for calibrating and a method for locking are also provided.

The method for calibrating uses a calibration system for calibrating the device 10 for generating a modulation. An example of such a calibration system 100 is represented in FIG. 14.

Figure 14:
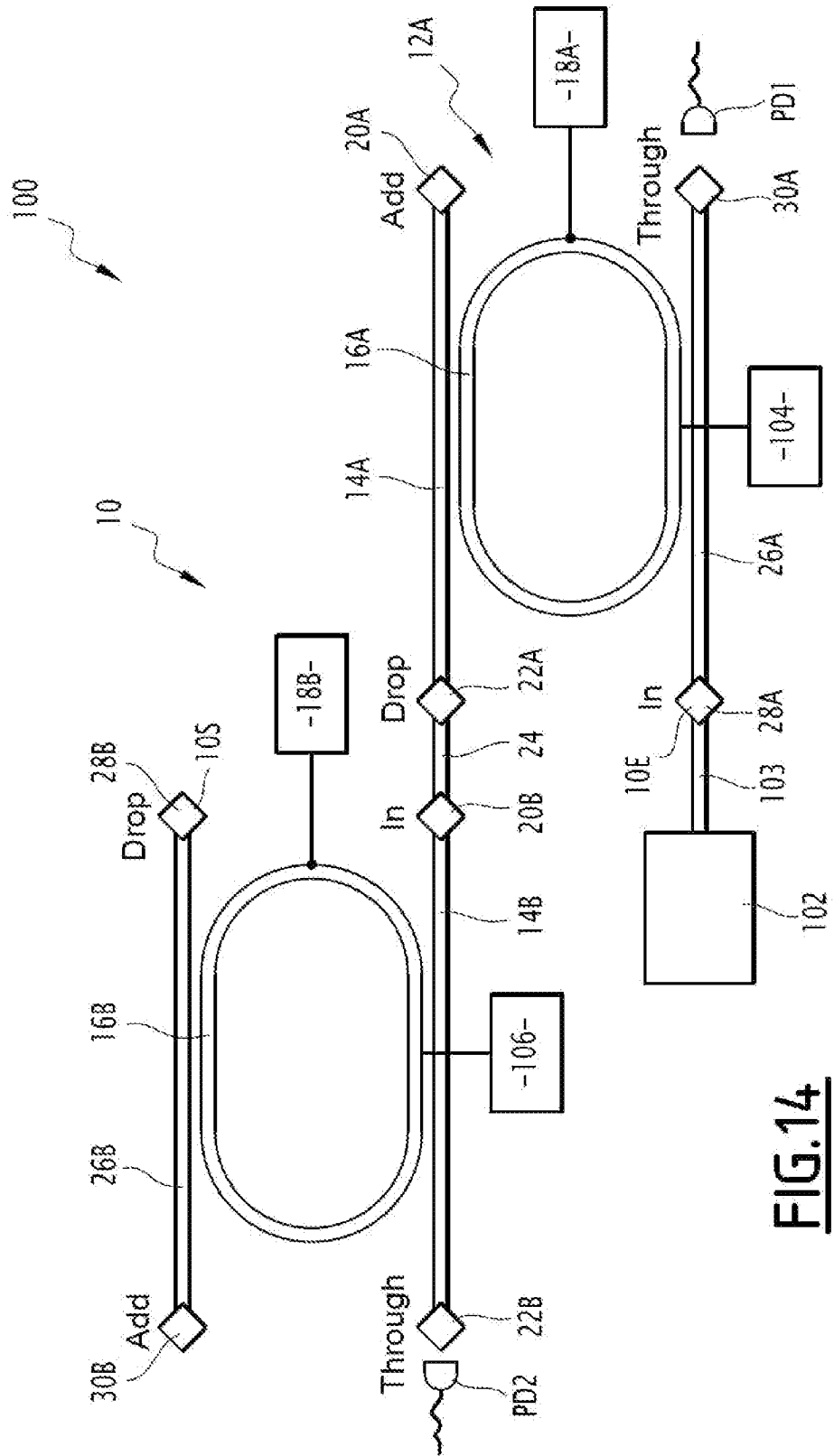
FIG. 14, is a schematic view of an example of the calibration system.

According to the example shown in FIG. 14, the calibration system 100 has a standard laser source 102, a device 10 for generating a modulation, a first photodiode PD1 and a second photodiode PD2.

The standard laser source 102 is a laser source that is capable of emitting a wave having a wavelength that is referenced as an absolute value. For this reason, the emission wavelength of the standard laser source 102 is assumed to be fixed for the calibration system 100 and is denoted in the following sections as $\lambda_{calibration}$.

The standard laser source 102 is connected to the input 10E of the device 10 for generating a modulation, for example via a waveguide 103. The standard laser source 102 is thus capable of injecting a wave whose wavelength $\lambda_{calibration}$ is referenced as an absolute value.

In the case of FIG. 14, the device 10 for generating a modulation is the device 10 for generating a modulation as shown in the FIG. 6.

In addition, the device 10 for generating a modulation is provided with two units for shifting the resonance wavelength 104, 106.

The first wavelength shifting unit 104 is capable of shifting the resonance wavelength of the first modulator 12A. Such a shift is, based on the first wavelength shifting unit 104 considered, a shift to higher or lower wavelengths.

By way of an example, the first wavelength shifting unit 104 is a heating element of the first ring 16A that provides the ability to locally modify the temperature of the first ring 16A, and thus the propagation index of the first ring 16A. This results in a modification of the resonance wavelength of the first modulator 12A.

The second wavelength shifting unit 106 is capable of shifting the resonance wavelength of the second modulator 12B. Such a shift is, based on the second wavelength shifting unit 104 considered, a shift to higher or lower wavelengths.

By way of an example, the second wavelength shifting unit 104 is a heating element of the second ring 16B that provides the ability to locally modify the temperature of the second ring 16B, and thus the propagation index of the second ring 16B. This results in a modification of the resonance wavelength of the second modulator 12B.

By way of a variant, the calibration system 100 is applicable to any type of device 10 for generating a modulation as described in the present application.

The first photodiode PD1 is positioned at the output of the Through port 30A of the first ring 16A. The first photodiode PD1 is thus capable of collecting the signal at the output of the Through port 30A.

By way of a variant, another type of photodetector may be used.

The second photodiode PD2 is positioned at the output of the Through port 22B of the second ring 16B. The second photodiode PD2 is thus capable of collecting the signal at the output of the Through port 22B.

By way of a variant, another type of photodetector may be used.

The operating of the calibration system 100 shall now be described with reference to the implementation of an example of the calibration method of the device 10 for generating a modulation.

In the general case, prior to the implementation of the method for calibrating, the resonance wavelength of the first modulator 12A, the resonance wavelength of the second modulator 12B and the wavelength $\lambda_{calibration}$ of emission of the standard laser source 102 are distinct considered in pairs.

The method for calibrating has a step of injecting a wave at a reference wavelength in the device 10 for generating a modulation. The injection step is carried out by injection of a wave coming from the standard laser source 102 at the input of the device 10 for generating a modulation. The reference wavelength is, thus, the wavelength $\lambda_{calibration}$ of emission of the standard laser source 102.

The method for calibrating has, subsequently, a step of adjustment of the resonance wavelength of the first modulator 12A on the reference wavelength $\lambda_{calibration}$ by using the signal at the output 22A of the first waveguide 14A when the wave at the wavelength $\lambda_{calibration}$ of emission of the standard laser source 102 is injected into the device 10 for generating a modulation.

The step of adjusting of the resonance wavelength of the first modulator 12A is carried out by using the first wavelength shifting unit 104 in order to cause a transmission minimum of the transfer function of the first modulator 12A to coincide with the wavelength $\lambda_{calibration}$ of emission of the standard laser source 102.

A convenient way of obtaining such a coincidence is to use the signal from the first photodiode PD1. Indeed, the observation of a local minimum of local intensity over the signal from the first photodiode PD1 corresponds to the occurrence of a coincidence between a transmission minimum of the transfer function of the first modulator 12A with the wavelength $\lambda_{calibration}$ of emission of the standard laser source 102.

In other words, according to a preferred example, the step of adjusting of the resonance wavelength of the first modulator 12A is carried out by adjusting the first wavelength shifting unit 104 until observing a minimum of intensity in the signal from the first photodiode PD1.

At the conclusion of the step of adjusting of the resonance wavelength of the first modulator 12A, the wavelength $\lambda_{calibration}$ of emission of the standard laser source 102 and the resonance wavelength of the first modulator 12A are equal.

The method for calibrating has, subsequently, a step of adjustment of the resonance wavelength of the second modulator 12B on the reference wavelength by using the signal at the output 28B of the second waveguide 14B when the wave at the wavelength $\lambda_{calibration}$ of emission of the standard laser source 102 is injected into the device 10 for generating a modulation.

The step of adjusting of the resonance wavelength of the second modulator 12B is carried out by using the second wavelength shifting unit 106 in order to cause a transmission minimum of the transfer function of the second modulator 12B to coincide with the wavelength $\lambda_{calibration}$ of emission of the standard laser source 102.

A convenient way of obtaining such a coincidence is to use the signal from the second photodiode PD2. Indeed, the observation of a local minimum of local intensity over the signal from the second photodiode PD2 corresponds to the occurrence of a coincidence between a transmission minimum of the transfer function of the second modulator 12B with the wavelength $\lambda_{calibration}$ of emission of the standard laser source 102.

In other words, according to a preferred example, the step of adjusting of the resonance wavelength of the second modulator 12B is carried out by adjusting the second wavelength shifting unit 106 until observing a minimum of intensity in the signal from the second photodiode PD2.

At the conclusion of the step of adjusting of the resonance wavelength of the second modulator 12B, the wavelength $\lambda_{calibration}$ of emission of the standard laser source 102 and the resonance wavelength of the second modulator 12B are equal.

The method for calibrating thus ensures the ability to align the resonance wavelengths of the two modulators 12A, 12B on a reference wavelength provided that there is available a laser source capable of emitting at the desired reference wavelength.

The proposed method for calibrating presents the advantage of being easy to implement since only the addition of two photodetectors on an unused port of the first modulator 12A and the unused port of the modulator 12B is involved. In addition, the method for calibrating is robust.

The method for locking uses a lock system that enables locking the wavelength of a laser source over the resonance wavelength of the second ring modulator 12B.

Figure 15:
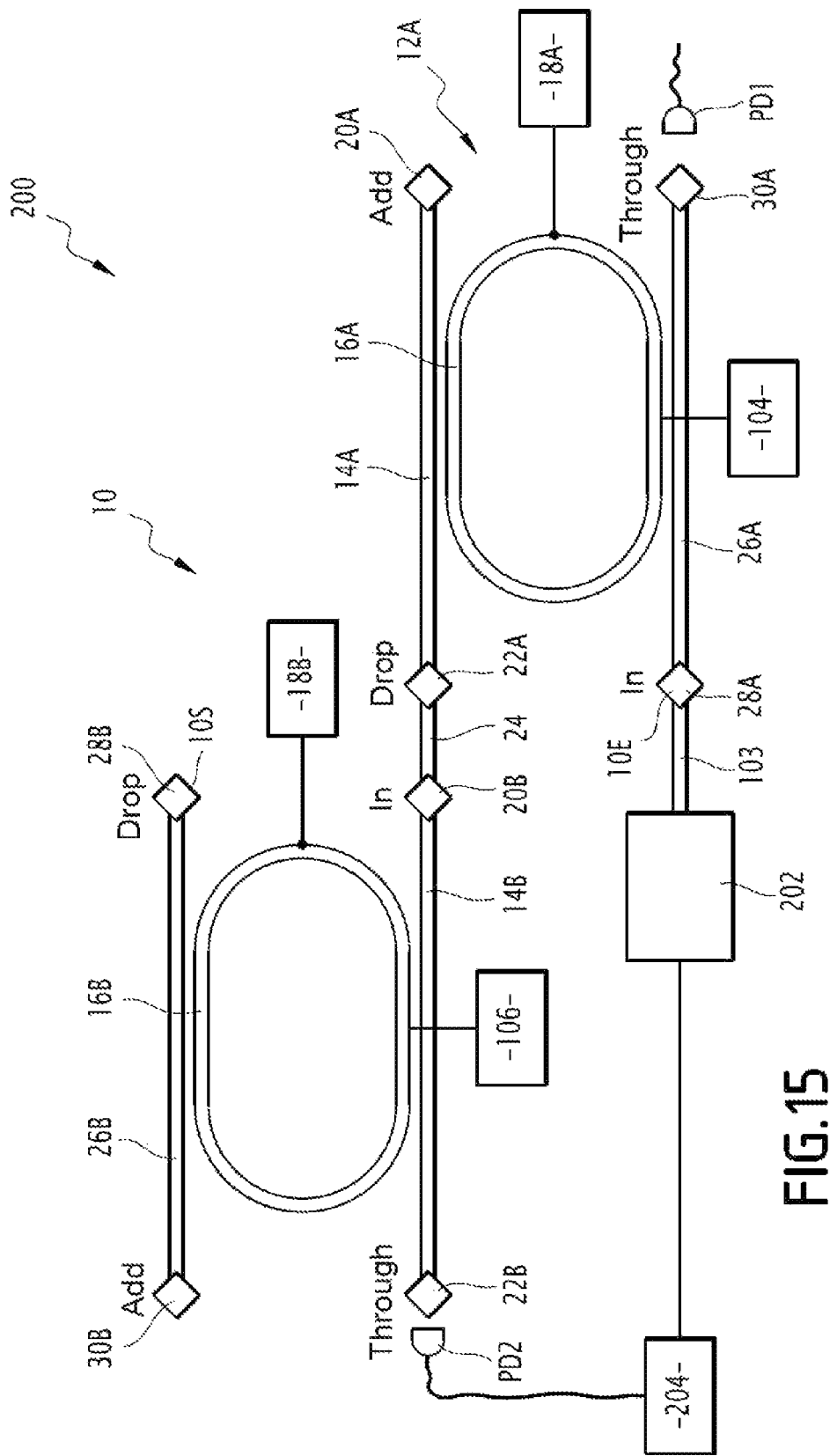
FIG. 15, is a schematic view of an example of the lock system.

An example of such a lock system 200 is shown in the FIG. 15.

The lock system 200 is similar to the calibration system 100 described with reference to the FIG. 14. As a result, only the elements which are different are described in the following sections, with the understanding that the other notes describing the calibration system 100 are equally valid and applicable to the lock system 200.

Instead of the standard laser source 102, the lock system 200 includes a laser source 202; this laser source 202 being capable of emitting a wave at a wavelength that is likely to vary over time, in particular due to the thermal heating.

The lock system 200 also includes a control unit 204 for controlling the laser source 202 connected on the one hand to the second photodiode PD2 and on the other hand to the laser source 202.

The control unit 204 is capable of converting the signal from the second photodiode PD2 into a lock signal, this lock signal serving to generate a command for the laser source 202 to be used for modifying the wavelength of emission of the laser source 202.

Typically, the control unit 204 includes of a comparator and an actuator. The comparator is capable of comparing the difference between the current value of the signal from the second photodiode PD2 and an ideal value and of converting the difference into a set point to be used for reducing the difference. The actuator is capable of applying the set point on the laser source 202. For example, the set point is a value for current.

Figure 16:
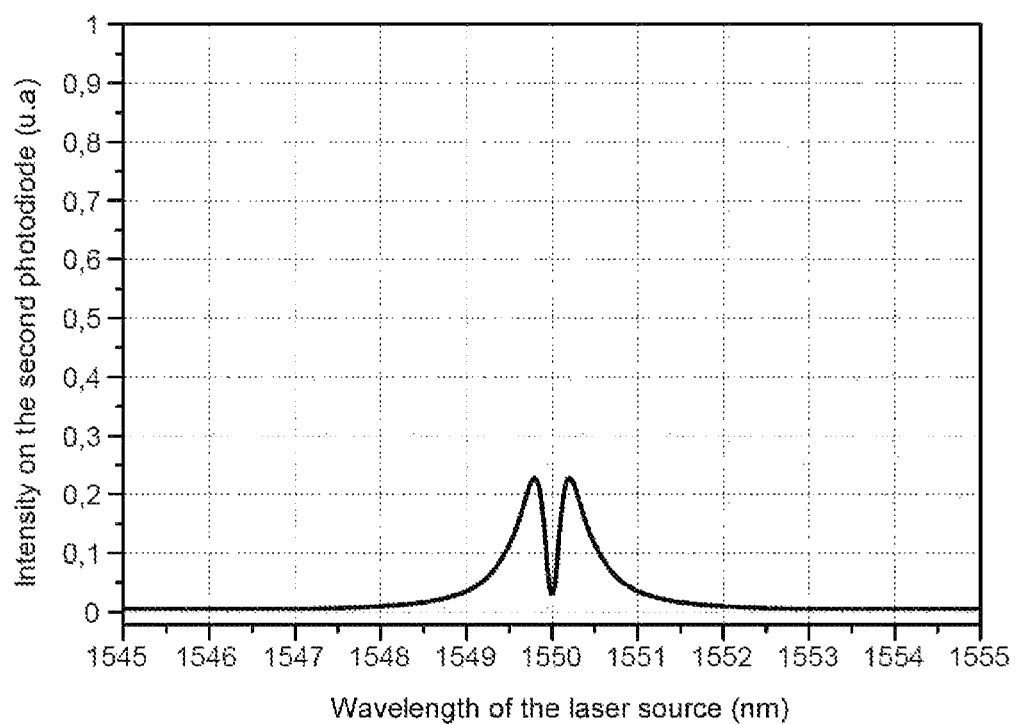
FIG. 16, is a graph illustrating the intensity of the two light signals based on the wavelength of the wave to be modulated by the device for generating a modulation.

The proposed method for locking is based on the exploitation of the shape of the spectral response of the second photodiode PD2. This shape is illustrated in the FIG. 16. It appears that the spectral response of the second photodiode PD2 has a local minimum of intensity when the wavelength of the laser source 202 is perfectly aligned with the resonance lengths of the two ring modulators 12A, 12B. By using the spectral response of the second photodiode PD2 as an error signal, it is thus possible to lock the wavelength of the laser source 202.

The method for locking proposed presents the advantage of being easy to implement and of being robust.

Annex: General Details About Ring Modulators

In optical transmissions, optical intensity modulation devices are generally used. There devices are of two types.

Certain modulation devices have the ability to directly modulate the optical intensity of the incident light wave when a modulated electrical command is applied to the device. The electro-absorption modulator, often referred to by the acronym EAM which is abbreviated from the English term "electro-absorption modulator", is one example of such devices.

Other modulators modulate the phase of the optical field of the incident light wave. By arranging a phase modulator in an interferometer, it is thus possible to obtain a modulation device capable of modulating the optical intensity of the incident light wave. The Mach-Zehnder modulator and the ring resonator modulator both belong to this type of modulator.

The ring resonator type modulator is often referred to by its English acronym RRM for "Ring Resonator Modulator". This device is particularly well known in the "silicon photonics" technology or "CMOS (Complementary Metal Oxide Semiconductor) photonics", wherein the modulator is implemented on a silicon substrate comprising a "silicon on insulator" stack. The ring resonator modulator, as developed in "silicon photonics" technology is described for example in the articles by Sasikanth Manipatruni, entitled "*Ultra-low voltage, ultra-small mode volume silicon microring modulator*", which was published in the journal OPTICS EXPRESS, Volume 18, Number 17 dated 16 Aug. 2010, and by Lin Zhang, entitled "*Silicon-Based Microring Resonator Modulators for Intensity Modulation*" published in the IEEE JOURNAL OF SELECTED TOPICS IN QUANTUM ELECTRONICS, Volume 16, Number 1, dated January/February 2010

Figure 9:
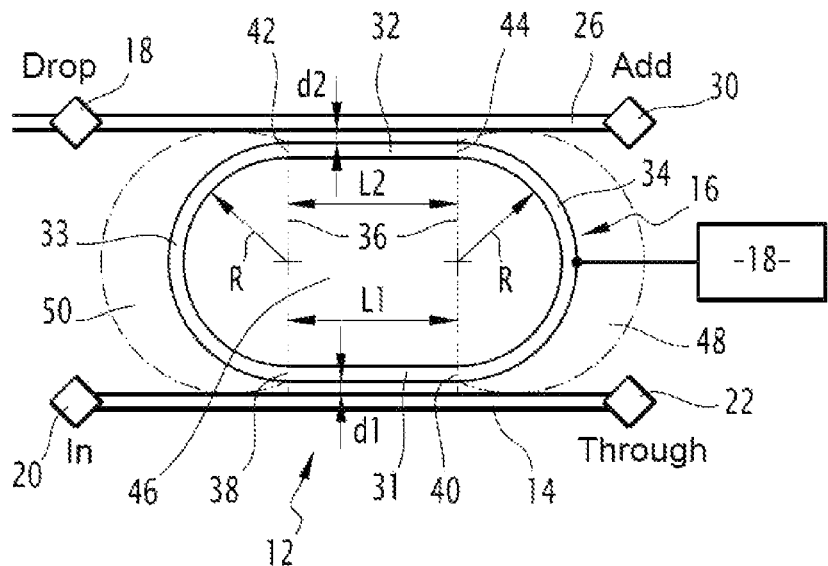
FIG. 9, is a schematic view of a ring resonator modulator.

Such a ring resonator modulator 12 is, for example, illustrated in the FIG. 9.

The modulator 12 has a waveguide 14 having an input and an output, and a ring waveguide 16. The ring waveguide is simply referred to as ring 16 in the rest of the annex.

The input 20 of the first waveguide 14 is a first light injection port 20 for the modulator 12 denoted by the English term "In Port".

The output 22 of the first waveguide 14 is a first light output port 22 for the modulator 12 denoted by the English term "Through port".

The previously mentioned English terms are generally used by the person skilled in the art specialising in this field and shall be used in the remainder of the annex. Thus the input 20 of the first waveguide 14 will be called In port and the output 22 of the waveguide 14 shall be called Through port.

A ring waveguide 16 is a waveguide having the shape of a closed loop.

The ring 16 presents, according to the example shown in FIG. 1, a substantially oblong shape. Such a ring 16 is often referred to by the English appellation "racetrack" on account of its similarity to a track for motor racing.

By way of a variant, the ring 16 has a circular shape.

The ring 16 is optically coupled to the waveguide 14. This signifies that the arrangement of the ring 16 and the waveguide 14 is such that a part of the light guided in the waveguide 14 is capable of being coupled and then of being guided in the ring 16.

Such a coupling is usually characterised by a coupling parameter denoted as K. By definition, the amplitude coupling parameter K is the ratio of the amplitude of the optical field which is coupled from the waveguide to the ring relative to the amplitude of the incident optical field in the waveguide.

The mode being propagated in the ring 16 is characterised by an effective index Neff. The term "effective index" is understood to refer to the index of the guided mode in the ring 16.

The modulator 12 also has a control device 18 capable of modulating the effective index Neff of the ring 16 in accordance with a control law.

By way of an example, the control device 18 is capable of applying a modulating voltage between the outer doped zones N (or P) and the inner doped zone P (N respectively) of the ring 16 in a manner such that the effective index Neff of the ring 16 varies. Thus, the control device 18 modulates the effective index Neff of the ring 16 between a value N0 (corresponding to a voltage V0) and a value Nmax (corresponding to a voltage Vmax).

By definition, when the effective index of the ring 16 is equal to the value N0, the modulator 12 is in the ON state. The optical intensity measured at the output of the modulator 12 in this ON state is known as $I_{ON}$. Similarly, when the effective index of the ring 16 is equal to the value Nmax, the modulator 12 is in the OFF state. The optical intensity measured at the output of the modulator 12 in this OFF state is known as $I_{OFF}$.

One of the means of characterising the performance of the modulator 12 is to provide the extinction ratio ER thereof which is defined by $$ER = 10 \cdot \log\left[\frac{I_{ON}}{I_{OFF}}\right].$$

In operation, when the light originating for example from a laser diode is injected into the in port of the modulator 12, the light is guided in the waveguide 14. A part of this light is coupled in the ring 16. After being propagated a certain number of times in the ring 16, the light is decoupled again in the waveguide 14. When the optical path traversed in the ring 16 corresponds to an integer times the wavelength of the light, a resonance is created in the ring 16, which results in a transmission minimum, at this wavelength, known as resonance transmission minimum, at the Through port of the waveguide 14.

This resonance wavelength shifts when the effective index of propagation of the mode in the ring 16 varies, under the action of a control device 18. At a given wavelength, a variation in the optical transmission then appears depending upon the control law.

In some cases, as illustrated for the example shown in the FIG. 9, the modulator 12 also has a second waveguide 26 having an input 30 and an output 18. The waveguide 14 is then referred to as the "first waveguide".

The input 30 of the second waveguide 26 is a second light injection port 30 for the modulator 12 denoted by the English term "Add port".

The output 18 of the second waveguide 26 is a second light output port 18 for the modulator 12 denoted by the English term "Drop port".

The previously mentioned English terms are generally used by the person skilled in the art specialising in this field and shall be used in the remainder of the annex. Thus the input 30 of the second waveguide 26 will be called the Add port and the output 18 of the second waveguide 26 will be called Drop Port.

The ring 16 is also optically coupled to the second waveguide 26.

In operation, when the light originating for example from a laser diode is injected into the in port of the modulator 12, the light is guided in the first waveguide 14. A part of this light is coupled in the ring 16. After being propagated a certain number of times in the ring 16, the light is decoupled again in the second waveguide 26. When the optical path traversed in the ring 16 corresponds to the sum of an integer times the wavelength of the light with half of the wavelength of the light, a resonance is created in the ring 16, which results in a transmission minimum, at this wavelength, known as resonance transmission minimum, at the drop port of the second waveguide 26.

This resonance wavelength shifts when the effective index of propagation of the mode in the ring 16 varies, under the action of a control device 18. At a given wavelength, a variation in the optical transmission then appears depending upon the control law.

In the configuration illustrated by the FIG. 9, two modes of operation have been described, one corresponding to a first transfer function called "Through function" in the following sections as a reference to the fact that the output of the modulator 12 used in this configuration is the Through port and a second transfer function called "Drop function" in the following sections as a reference to the fact that the output of the modulator 12 used in this configuration is the Drop port. The Through and Drop functions are the same whether the modulator 12 is used in either the carrier injection or carrier depletion mode.

In order to mathematically express these functions, it is necessary, first of all, to define the parameters characterising the modulator 12. For the sake of clarity, these parameters shall be defined for the specific geometry of the modulator 12 shown in the FIG. 9, it being understood that the person skilled in the art will know how to define these parameters for any possible geometry.

In the case shown in the FIG. 9, the ring 16 has four sections, two intermediate sections 31 and 32 connected to two end sections 33 and 34. each section 31, 32, 33, 34 is delimited by dotted lines 36.

Each intermediate section 31, 32 of the ring 16 is a rectilinear section extending along an axis X.

The first intermediate section 31 is the section which is closest to the first waveguide 14.

The distance d1 between the first intermediate section 31 and the first waveguide 14 is known, in the remainder of the annex, as the distance between the first waveguide 14 and the ring 16.

The first intermediate section 31 extends between a first end 38 and a second end 40.

The distance between the two ends 38 and 40 of the first intermediate section 31 defines the length L1 of the first intermediate section 31. This length L1 corresponds to the length of interaction between the ring 16 and the first waveguide 14.

According to the variant example in which the ring 16 is circular, the length L1 is zero.

The second intermediate section 32 is the section which is closest to the second waveguide 26.

The distance d2 between the second intermediate section 32 and the second waveguide 26 is known, in the remainder of the annex, as the distance between the second waveguide 26 and the ring 16.

The second intermediate section 32 extends between two ends 42 and 44.

The distance between the two ends 42 and 44 of the second intermediate section 32 defines the length L2 of the second intermediate section 32. This length L2 corresponds to the length of interaction between the ring 16 and the second waveguide 26.

According to the variant example in which the ring 26 is circular, the length L2 is zero.

According to the particular example shown in FIG. 9, the two lengths of interaction L1, L2 are equal, which is expressed mathematically by the relationship $L1=L2=L$.

The two end sections 33, 34 are waveguides in the shape of semi-circles of the same radius of curvature R.

By somewhat imprecise linguistic extension, the radius of curvature R of the end sections 33, 34 is regarded as the radius of curvature of the ring 16.

According to one variant example, the two radii of curvature of the two end sections 33, 34 are different. In this case, the radius of curvature of the ring 26 is an average of the two radii of curvature of the two end sections 33, 34.

Thus, in an entirely general sense, the ring 16 is characterised by five distances which are:
- the distance d1 between the ring 16 and the first waveguides 14 of the modulator 12,
- the distance d2 between the ring 16 and the second waveguide 26 of the modulator 12,
- the radius of curvature R of the ring 16 of the modulator 12,
- the length of interaction L1 between the ring 16 and the first waveguide 14 of the modulator 12,
- the length of interaction L2 between the ring 16 and the second waveguide 26 of the modulator 12.

The modulator 12 is not only characterised by the geometrical parameters as previously presented. The modulator 12 may also be characterised by other parameters which are as follows:
- the voltage control law applied to the ring 16 of the modulator 12,
- the parameter of coupling k1 between the ring 16 and the first waveguide 14 of the modulator 12, the parameter of coupling k2 between the ring 16 and the second wave-guide 26 of the modulator 12.

It is to be noted that the parameters of coupling k1 and k2 includes parameters of geometrical type since these parameters depend on the length of interaction L1 and L2 as well as on the distances d1 and d2 between the waveguide considered and the ring 16.

Moreover, any size or linear combination resulting from the above mentioned parameters by means of a mathematical function may be possibly used to characterise the modulator 12.

As shown in the following sections of the description, these parameters are used to express the transfer functions for the modulator 12.

To do this, it is common to define a transfer matrix for the ring 16. This transfer matrix M is defined by the following relationship:

$$\begin{vmatrix} E_{add}(t) \\ E_{drop}(t) \end{vmatrix} = M \begin{vmatrix} E_{in}(t) \\ E_{Through}(t) \end{vmatrix}$$

Where:
$E_{add}(t)$ is the optical field at the Add port of the ring 16
$E_{drop}(t)$ is the optical field at the Drop port of the ring 16
$E_{in}(t)$ is the optical field at the In port of the ring 16, and
$E_{through}(t)$ is the optical field at the Through port of the ring 16.

The transfer matrix M is written as:

$M = H_2 \cdot G \cdot H_1$

Where:

$$H_1 = -\frac{1}{ik_1^2} \begin{vmatrix} -\sqrt{1-k_1^2} & e^{-i\beta L} \\ -e^{i\beta L} & \sqrt{1-k_1^2} \end{vmatrix},$$

$$H_2 = -\frac{1}{ik_2^2} \begin{vmatrix} -\sqrt{1-k_2^2} & e^{-i\beta L} \\ -e^{i\beta L} & \sqrt{1-k_2^2} \end{vmatrix},$$

$$G = \begin{vmatrix} 0 & \alpha \cdot e^{i\beta R} \\ \frac{1}{\alpha} \cdot e^{-i\beta R} & 0 \end{vmatrix},$$

$\alpha = a^2$ is the attenuation of the optical intensity after a turn of the ring 16,
$\lambda_{OPT}$ is the wavelength of the light at the input of the modulator 12, and $$\beta = \frac{2\pi N_{eff}}{\lambda_{OPT}}.$$

For an optical field $E_{in}$ at the input of the modulator, the optical power $P_{in}$ amounts to 1 and the phase $\Phi_{in}$ is zero (a simple normalisation makes it possible to be brought back to this case), this matrix equation provides the ability to deduce the transfer functions known as "Drop function" and "Through function" previously defined above.

Figure 10:
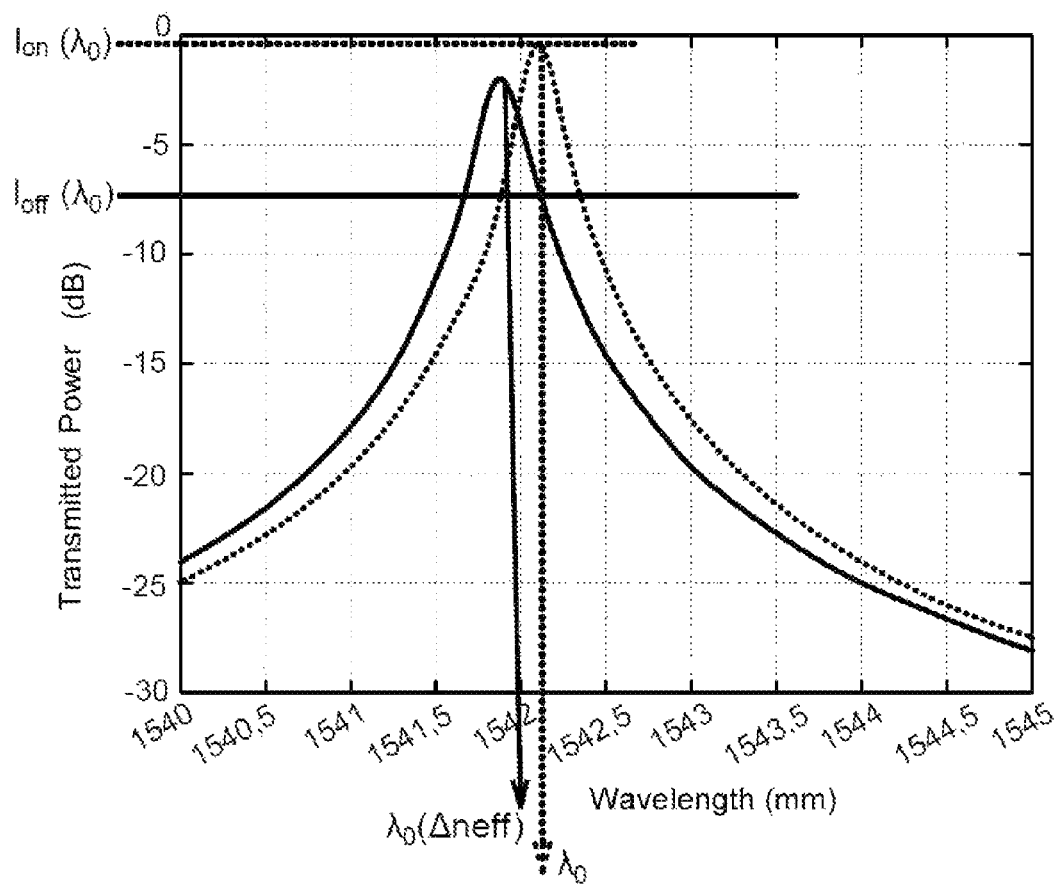
FIG. 10, is a graph showing the simulated change in the modulus of the transfer function at the output of the Drop port as a function of the wavelength of the input light of the modulator shown in FIG. 9 in the presence and in the absence of a modulation of the effective index of the ring.

The FIG. 10 is a graph illustrating the evolution of the modulus of the transfer function known as Drop function, that is to say the variation of the intensity transmitted at the Drop port, depending on the wavelength of the light at the input of the ring 16. The curve represented in dotted line illustrates the evolution of the transfer function modulus with no variation of the effective index of the ring 16 whereas the curve represented in solid line shows the evolution of the transfer function modulus in the presence of a variation of the effective index of the ring 16 of $2 \cdot 10^{-4}$. In the context of this simulation, the characteristic values taken for the ring 16 are R=5 µm, L=0, P=2 dB/cm and k=0.2. The outcome observed is a shift of the maximum of the transfer function.

Figure 11:
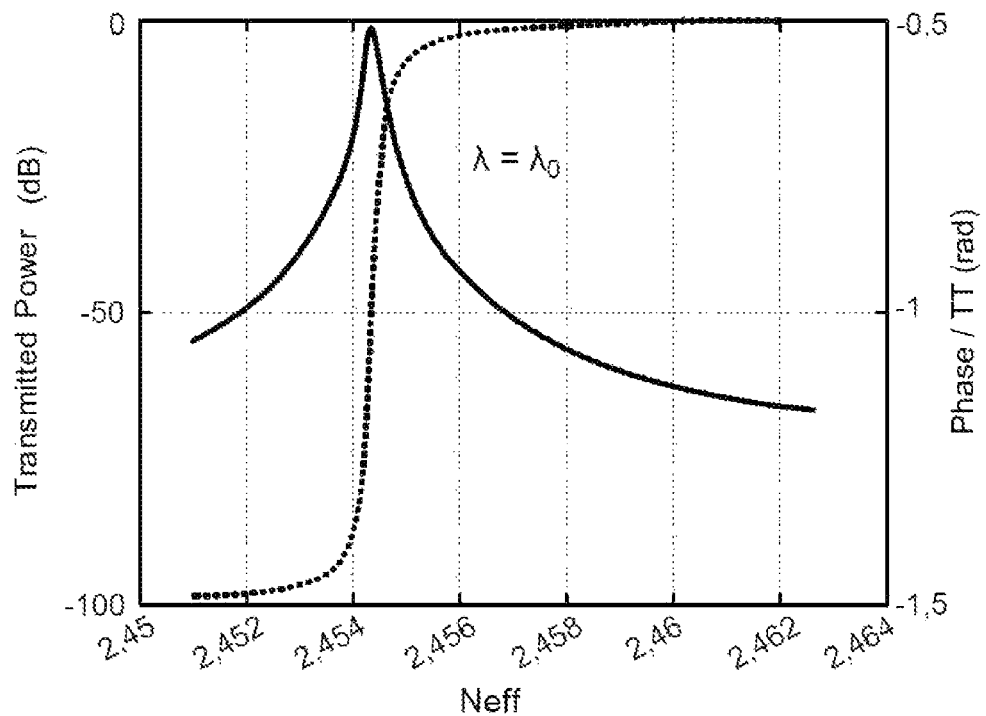
FIG. 11, is a graph showing the change in the modulus of the transfer function as well as the phase of the transfer function at the resonance wavelength at the output of the Drop port as a function of the effective index for the modulator shown in FIG. 9.

Under the same conditions for simulations, the FIG. 11 is a graph showing the evolution of the modulus of the transfer function known as Drop function as well as of the phase of the transfer function known as Drop function at the resonance wavelength as a function of the effective index Neff of the ring 16. It appears that it is possible to cause the varying of the intensity of the optical field transmitted on the Drop port. In the example considered, the extinction ratio of the modulator is 6.8 dB for a variation of effective index of $2 \cdot 10^{-4}$. In addition, it should be noted that the chirp parameter α calculated is equal to 2.4.

Figure 12:
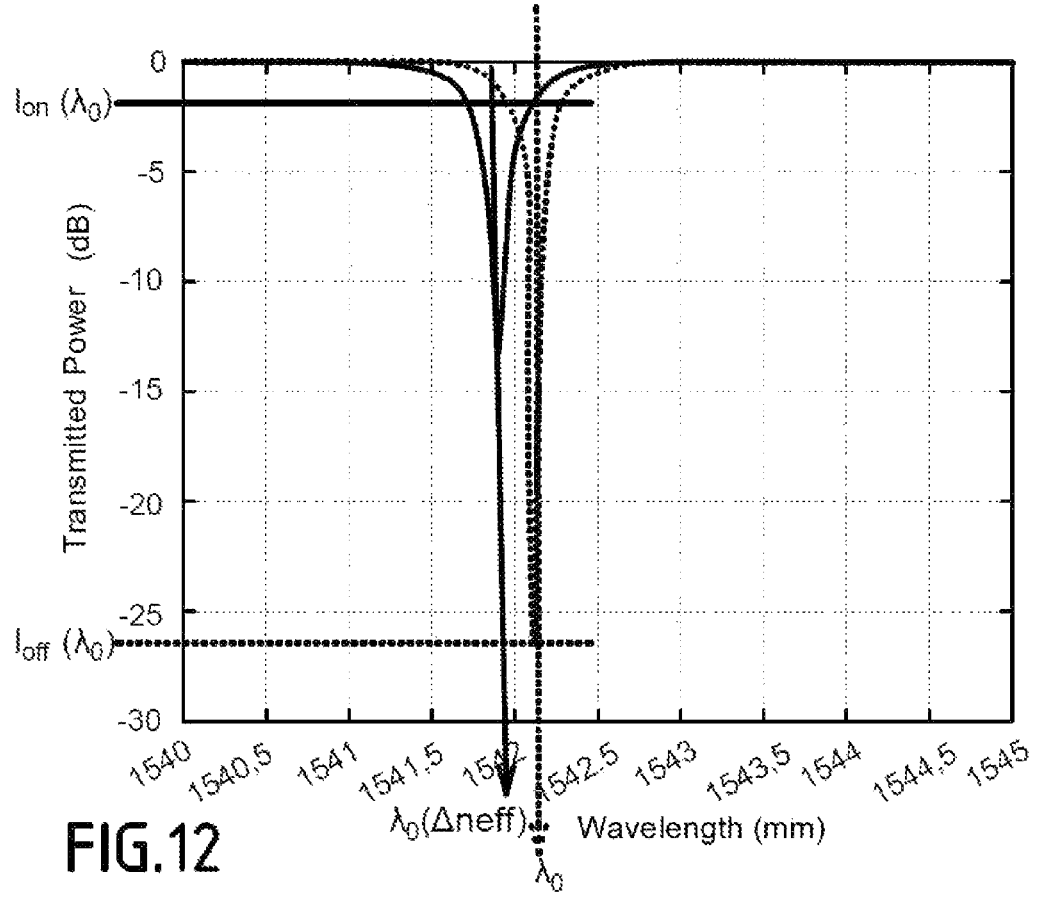
FIGS. 12 and 13, are respectively, the same figures as FIGS. 10 and 11 at the output of the Through port instead of the Drop port.

The FIG. 12 is a graph illustrating the evolution of the modulus of the transfer function known as Drop function, that is to say the variation of the intensity transmitted at the Through port, depending on the wavelength of the light at the input of the ring 16. The curve represented in dotted line illustrates the evolution of the transfer function modulus with no variation of the effective index of the ring 16 whereas the curve represented in solid line shows the evolution of the transfer function modulus in the presence of a variation of the effective index of the ring 16 of $2 \cdot 10^{-4}$. In the context of this simulation, the characteristic values taken for the ring 16 are R=5 µm, L=0, P=2 dB/cm, k1=0.2 and k2=0. The outcome observed is a shift of the minimum of the transfer function.

Figure 13:
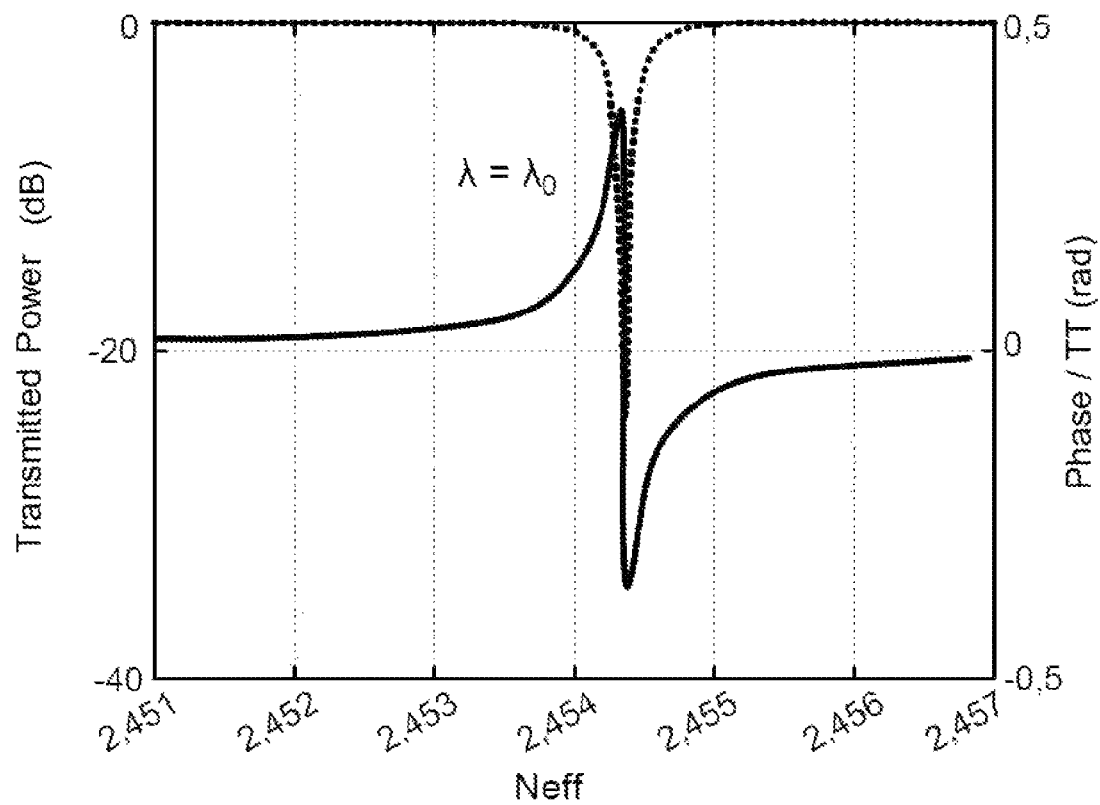

Under the same conditions for simulations, the FIG. 13 is a graph showing the evolution of the modulus of the transfer function known as Through function as well as of the phase of the transfer function known as Through function at the resonance wavelength as a function of the effective index Neff of the ring 16. It appears that it is possible to cause the varying of the intensity of the optical field transmitted on the Through port. In the example considered, the extinction ratio of the modulator is 25 dB for a variation of effective index of $2 \cdot 10^{-4}$. In addition, it should be noted that the chirp parameter α is very large and variable over time.

From the standpoint of manufacturing technology, in a general manner, the ring modulator 12 may possibly be manufactured with any technology demonstrating an electro-optical effect, that is to say a change in the effective index of the ring waveguide under the effect of a voltage (or of a current). Indium phosphide (often referred to by its chemical symbol InP) or lithium niobate (often referred to by its chemical symbol LiNbO3) are examples of developed technology showing an electro-optical effect. Silicon photonics technology also offers such electro-optical properties: thus, it is possible to modulate the effective index of a silicon waveguide in which one or more junctions PN or PIN are formed, by applying a voltage modulated across the terminals of this (or these junctions) PN or PIN. When the ring resonator modulator is built using the "silicon photonics" technology, a PN or PIN junction is thus formed on the ring waveguide (along the waveguide or transversely relative to the waveguide). In the case of a junction formed along the waveguide, the inner zone is, for example made of P doped silicon (or N doped), and the outer zone of the ring is made of N doped silicon (P doped respectively).

The invention claimed is:

1. A device generating a modulation of an optical signal wherein the device comprises:
   a first ring resonator modulator comprising:
      a first waveguide having an input, and an output,
      a first ring waveguide, referred to as first ring, the first ring being optically coupled to the first waveguide and having a first effective index, and
      a first control device capable of modulating the first effective index of the first ring in accordance with a first control law,
      wherein the first ring resonator modulator has a first transfer function defined as a ratio between an optical field at an output of the first ring resonator modulator and an incident optical field and presents first parameters influencing the first transfer function, and
   a second ring resonator modulator comprising:
      a second waveguide having an input and an output,
      a second ring waveguide, referred to as second ring, the second ring being optically coupled to the second waveguide having a second effective index, and
      a second control device capable of modulating the second effective index of the second ring in accordance with a second control law,
         wherein the input of the second waveguide being connected to the output of the first waveguide,
         wherein the second ring being independent from the first ring,
      wherein the second ring resonator modulator has a second transfer function defined as a ratio between an optical field at an output of the second ring resonator modulator and an incident optical field and presents second parameters influencing the second transfer function,
   wherein the device having at least one characteristic that influences a chirp introduced by the device, the characteristics of the device being chosen so as to minimise an absolute value of the chirp introduced by the device, and
      wherein the characteristics influencing the chirp introduced by the device are the first parameters and the second parameters.

2. The device according to claim 1, wherein the two ring resonator modulators are identical.

3. The device according to claim 1, wherein the first control law and the second control law are such that when the first effective index varies by a first quantity, the second effective index varies by a second quantity of equivalent magnitude but with the opposite sign relative to the first quantity.

4. The device according to claim 1, wherein the first and second control laws respectively control the first and second ring modulators by injection of carriers, wherein the first control law is a voltage varying between $V_{BIAS}$ and $V_{BIAS}-A$, with A being a positive value and $V_{BIAS}$ being a value strictly greater than A and the second control law is a voltage varying between $V_{BIAS}$ and $V_{BIAS}+\beta*A$, with $\beta$ being a strictly positive value.

5. The device according to claim 1, wherein the first and second control laws respectively control the first and second ring modulators by depletion of carriers, wherein the first control law is a voltage varying between $-V_{BIAS}$ and $-V_{BIAS}+A$, with A being a positive value and $V_{BIAS}$ being a value strictly greater than A and the second control law is a voltage varying between $-V_{BIAS}$ and $-V_{BIAS}-\beta*A$, with $\beta$ being a strictly positive value.

6. The device according to claim 1 comprising an input, an output and an intermediate waveguide, wherein the intermediate waveguide connects the input of the second waveguide to the output of the first waveguide.

7. The device according to claim 1 comprising an input, an output, wherein
   the first ring resonator modulator comprises a third waveguide having an input and an output, the third waveguide being optically coupled to the first ring, and the input of the device being the input of the third waveguide.

8. The device according to claim 1, wherein the first waveguide and the second waveguide are combined.

9. A method cancelling a chirp introduced by a device generating a modulation of an optical signal for an incident optical signal, the device generating a modulation comprising:
   a first ring resonator modulator comprising:
      a first waveguide having an input and an output,
      a first ring waveguide, referred to as first ring, the first ring being optically coupled to the first waveguide and having a first effective index, and
      a first control device capable of modulating the first effective index of the first ring in accordance with a first control law,
      wherein the first ring resonator modulator has a first transfer function defined as a ratio between an optical power at an output of the first ring resonator modulator and an incident optical power and presents first parameters influencing the first transfer function, and
   a second ring resonator modulator comprising:
      a second waveguide having an input and an output, the input of the second waveguide being connected to the output of the first waveguide,
      a second ring waveguide, referred to as second ring, the second ring being optically coupled to the second waveguide having a second effective index, and being independent from the first ring, and
      a second control device capable of modulating the second effective index of the second ring in accordance with a second control law,
      wherein the second ring resonator modulator has a second transfer function defined as a ratio between an optical power at an output of the second ring resonator modulator and an incident optical power and presents second parameters influencing the second transfer function, and
   wherein the method comprising the steps of:
      choice of initial characteristics for the device, and
      modification of at least one of the initial characteristics of the device so as to minimise an absolute value of the chirp introduced by the device,
         wherein the characteristics modified during the step of modification are selected among the first parameters and the second parameters.

10. The method for cancelling according to claim 9, wherein during the choice on step, the initial characteristics for the device for generating a modulation are such that the two ring resonator modulators are identical.

11. The method for cancelling according to claim 9, wherein during the step of modification, only the characteristics relating to the first control law and the characteristics relating to the second control law are modified.

12. The method for cancelling according to claim 9, wherein, during the step of modification, the first control law and the second control law are modified such that when the first effective index varies by a first quantity, the second effective index varies by a second quantity of equivalent magnitude but with the opposite sign relative to the first quantity.

13. A method calibrating a device generating a modulation of an optical signal according to claim 1, comprising the successive steps of:
- injection of a wave at a reference wavelength into the device generating a modulation of an optical signal,
- adjusting of the resonance length of the first modulator on the reference wavelength by using the output signal from the first waveguide when the wave at a reference wavelength is injected into the device for generating a modulation of an optical signal, and
- adjusting of the resonance length of the second modulator on the reference wavelength by using the output signal from the second waveguide when the wave at a reference wavelength is injected into the device for generating a modulation of an optical signal.

14. A method locking the emission wavelength of a laser source on a device generating a modulation of an optical signal according to claim 1, comprising the use of the output signal of the second waveguide when the device generating a modulation of an optical signal is fed by the laser source.

* * * * *